(12) United States Patent
Yehuday

(10) Patent No.: US 10,733,989 B2
(45) Date of Patent: Aug. 4, 2020

(54) PROXIMITY BASED VOICE ACTIVATION

(71) Applicant: DSP Group Ltd., Herzeliya (IL)

(72) Inventor: Uri Yehuday, Holon (IL)

(73) Assignee: DSP Group Ltd., Herzeliya (IL)

( * ) Notice: Subject to any disclaimer, the term of this patent is extended or adjusted under 35 U.S.C. 154(b) by 0 days.

(21) Appl. No.: 15/810,169

(22) Filed: Nov. 13, 2017

(65) Prior Publication Data

US 2018/0151180 A1     May 31, 2018

Related U.S. Application Data

(60) Provisional application No. 62/427,863, filed on Nov. 30, 2016.

(51) Int. Cl.

| | |
|---|---|
| *G10L 15/22* | (2006.01) |
| *G10L 15/08* | (2006.01) |
| *G10L 15/24* | (2013.01) |
| *G10L 25/51* | (2013.01) |
| *G06F 3/16* | (2006.01) |
| *H04R 29/00* | (2006.01) |
| *H04R 3/00* | (2006.01) |
| *H04R 1/40* | (2006.01) |

(52) U.S. Cl.
CPC .............. *G10L 15/22* (2013.01); *G06F 3/167* (2013.01); *G10L 15/08* (2013.01); *G10L 15/24* (2013.01); *G10L 25/51* (2013.01); *H04R 3/005* (2013.01); *H04R 29/001* (2013.01); *G10L 2015/088* (2013.01); *G10L 2015/223* (2013.01); *H04R 1/406* (2013.01)

(58) Field of Classification Search
CPC ......... G10L 15/22; G10L 15/08; G10L 15/24; G10L 25/51; G10L 2015/088; G10L 2015/223; G06F 3/167; H04R 3/005; H04R 29/001; H04R 1/406
See application file for complete search history.

(56) References Cited

U.S. PATENT DOCUMENTS

| | | | | |
|---|---|---|---|---|
| 6,631,179 | B1 * | 10/2003 | Sifuentes | H04M 1/271 379/159 |
| 9,251,787 | B1 * | 2/2016 | Hart | G10L 15/22 |
| 9,953,654 | B2 * | 4/2018 | Mun | G10L 17/22 |
| 2004/0066918 | A1 * | 4/2004 | Sifuentes | H04M 1/02 379/88.01 |
| 2008/0260169 | A1 * | 10/2008 | Reuss | H04R 1/10 381/58 |
| 2010/0314419 | A1 * | 12/2010 | Real | A47J 31/401 222/236 |

(Continued)

FOREIGN PATENT DOCUMENTS

| | | | | |
|---|---|---|---|---|
| CA | 2310176 | A1 * | 12/2000 | G10L 15/22 |
| EP | 2801972 | A1 * | 11/2014 | G06F 21/32 |

*Primary Examiner* — Mohammad K Islam
(74) *Attorney, Agent, or Firm* — Reches Patent

(57) ABSTRACT

A method for proximity-based voice activation, the method may include sensing a voice command, detecting whether a person outputted the voice command while being in proximity to a voice activated device; determining whether to execute, by the voice activated device, the voice command based, at least in part, on the determination whether the person outputted the voice command while being in proximity to the voice activated device; and executing the voice command when determining to execute the voice command.

24 Claims, 5 Drawing Sheets

(56) References Cited

U.S. PATENT DOCUMENTS

| | | | | |
|---|---|---|---|---|
| 2011/0178947 | A1* | 7/2011 | McNutt | A47F 10/06 |
| | | | | 705/346 |
| 2012/0209670 | A1* | 8/2012 | Zealer | G06Q 30/02 |
| | | | | 705/14.1 |
| 2013/0073293 | A1* | 3/2013 | Jang | G10L 15/22 |
| | | | | 704/275 |
| 2014/0330560 | A1* | 11/2014 | Venkatesha | G06F 21/32 |
| | | | | 704/235 |
| 2015/0103248 | A1* | 4/2015 | Zealer | H04N 5/64 |
| | | | | 348/553 |
| 2015/0340040 | A1* | 11/2015 | Mun | G10L 17/22 |
| | | | | 704/246 |
| 2016/0057522 | A1* | 2/2016 | Choisel | H04R 1/08 |
| | | | | 381/92 |
| 2016/0182800 | A1* | 6/2016 | Kaneko | H04N 5/23203 |
| | | | | 348/211.4 |
| 2016/0286468 | A1* | 9/2016 | Wang | H04W 48/16 |
| 2016/0351191 | A1* | 12/2016 | Vilermo | G10L 15/22 |
| 2017/0134452 | A1* | 5/2017 | Belimpasakis | H04L 67/26 |
| 2017/0186446 | A1* | 6/2017 | Wosk | G10L 25/78 |
| 2018/0004372 | A1* | 1/2018 | Zurek | G06F 3/0484 |
| 2018/0032997 | A1* | 2/2018 | Gordon | G06Q 20/3224 |
| 2018/0124356 | A1* | 5/2018 | Ferrer Zaera | G10L 15/02 |
| 2018/0204471 | A1* | 7/2018 | Morris | G08G 9/02 |
| 2018/0308477 | A1* | 10/2018 | Nagasaka | G08C 17/02 |

* cited by examiner

PROXIMITY BASED VOICE ACTIVATION

CROSS REFERENCE

This application claims priority from US provisional patent Ser. No. 62/427,863 filing date Nov. 30, 2016 which is incorporated herein by reference.

BACKGROUND OF THE INVENTION

In the Internet of Things (IoT) future, many devices are designed to work using voice commands.

Currently, a voice command must start with a voice trigger (keyword) that is needed to prepare the device for the execution of the voice command. Each device may have its own voice trigger.

For example—each command aimed to the Alexa (made by Amazon, California, USA) has to start with the voice trigger "Alexa" (for example "Alexa, volume up"). Google operated devices each command has to start with the voice trigger "Google". Ski (of Apple Inc. of California) may be activated by "Siri".

Using these voice triggers is cumbersome—especially when a certain environment includes multiple voice controlled devices.

SUMMARY

There may be provided a method for proximity-based voice activation, the method may include sensing a voice command, detecting whether a person outputted the voice command while being in proximity to a voice activated device; determining whether to execute, by the voice activated device, the voice command based, at least in part, on the determination whether the person outputted the voice command while being in proximity to the voice activated device; and executing the voice command when determining to execute the voice command.

The method may include executing the voice command regardless of a presence of a voice trigger within the voice command, when determining that the person outputted the voice command while being in proximity to the voice activated device.

The method may include executing the voice command only when (a) a voice trigger may be included in the beginning of the voice command and (b) determining that the person outputted the voice command while being in proximity to the voice activated device.

The method may include executing the voice command when a voice trigger may be included in the beginning of the voice command.

The detecting may include generating, by multiple microphones of a voice activated device, detection signals that may be responsive to audio signals sensed by the multiple microphones; and analyzing the detection signals, by an audio processor, to determine whether the person outputted the voice command while being in proximity to the voice activated device.

The detecting may include heat based proximity sensing.

The detecting may include electromagnetic based proximity sensing.

The detecting may include visual based proximity sensing.

The detecting may include near field based proximity sensing.

The method may include setting a proximity range based on distances between different voice activated devices.

The method may include setting a proximity range to be smaller than half a distance between different voice activated devices.

The method may include setting a proximity range based on (a) a distance between different voice activated devices, and (b) reception parameters of the different voice activated devices.

There may be provided a proximity-based voice activated device, the device may include one or more circuits that may be configured to sense a voice command, detect whether a person outputted the voice command while being in proximity to a voice activated device; determine whether to execute, by the voice activated device, the voice command based, at least in part, on the determination whether the person outputted the voice command while being in proximity to the voice activated device; and execute the voice command when determining to execute the voice command.

The proximity-based voice activated device wherein the voice activated device may be configured to execute the voice command regardless of a presence of a voice trigger within the voice command, when determining that the person outputted the voice command while being in proximity to the voice activated device.

The proximity-based voice activated device wherein the voice activated device may be configured to execute the voice command only when (a) a voice trigger may be included in the beginning of the voice command and (b) determining that the person outputted the voice command while being in proximity to the voice activated device.

The proximity-based voice activated device wherein the voice activated device may be configured to execute the voice command when a voice trigger may be included in the beginning of the voice command.

The proximity-based voice activated device wherein the one or more circuits may include multiple microphones that may be configured to generate detection signals that may be responsive to audio signals sensed by the multiple microphones; and an audio processor that may be configured to analyze the detection signals, to determine whether the person outputted the voice command while being in proximity to the voice activated device.

The one or more circuits may include a heat based proximity sensor.

The one or more circuits may include an electromagnetic based proximity sensor.

The one or more circuits may include a visual based proximity sensor.

The one or more circuits may include a near field based proximity sensor.

The one or more circuits may be configured to set a proximity range based on distances between different voice activated devices.

The one or more circuits may be configured to set a proximity range to be smaller than half a distance between different voice activated devices.

The one or more circuits may be configured to set a proximity range based on (a) a distance between different voice activated devices, and (b) reception parameters of the different voice activated devices.

The proximity-based voice activated device may be a mobile phone.

There may be provided a non-transitory computer readable medium that stores instructions that once executed by a proximity-based voice activated device cause the proximity-based voice activated device to execute the steps of sensing a voice command, detecting whether a person outputted the voice command while being in proximity to a voice activated device; determining whether to execute, by the voice activated device, the voice command based, at least in part, on the determination whether the person outputted the voice command while being in proximity to the voice activated device; and executing the voice command when determining to execute the voice command.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
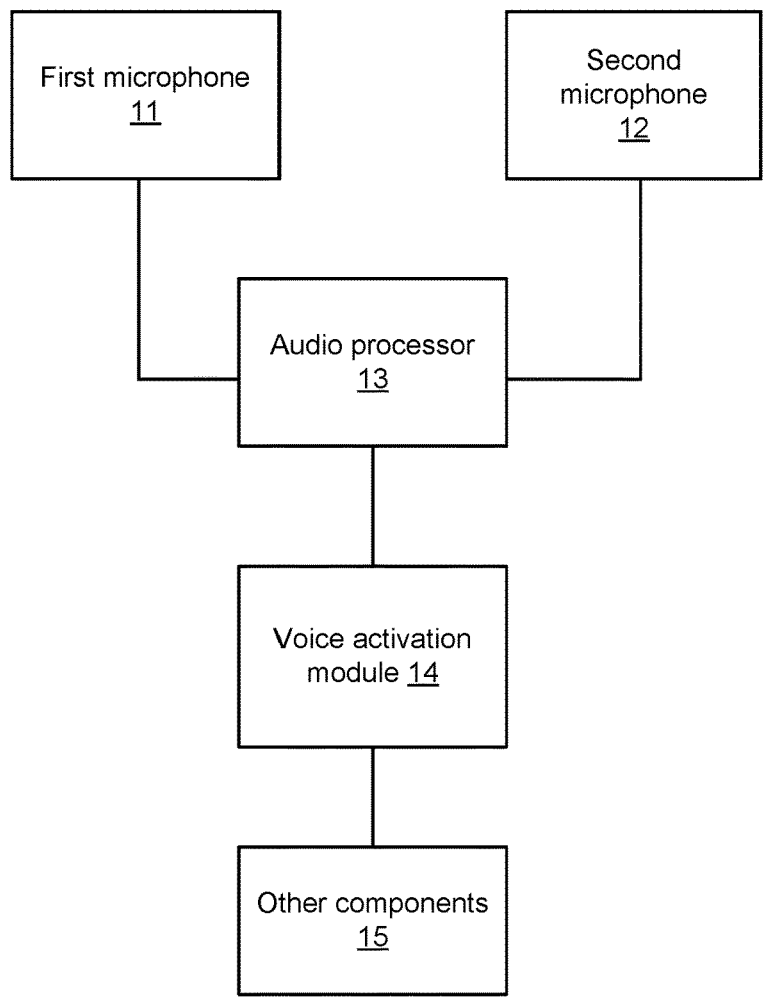
FIG. 1 illustrates an example of a voice activated device.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

According to an embodiment of the invention there is provided a device and method for voice command activation using proximity sensing.

The proximity sensing may be applied in place of or in addition to keyword based voice command activation.

When applied in addition to the keyword based voice command activation the proximity sensing may provide another layer of security and may be used to elect which voice activated device to activate out of multiple voice activated devices that concurrently sense the voice command.

When applied instead of the keyword based voice command activation—the proximity sensing may simplify the voice activation and may be used to control voice activated devices that are not configured to perform keyword based voice activation.

The proximity detection may be based on any proximity sensing such as audio-based proximity sensing, heat based proximity sensing, electromagnetic sensing based proximity sensing, visual based proximity sensing, near field sensing and the like.

FIG. 1 illustrates audio-based proximity sensing that involves analyzing audio signals sensed by multiple microphones of a voice activated device.

FIG. 1 illustrates an example of a voice activated device 10.

Voice activated device 10 may include multiple microphones that are spaced apart from each other such as first microphone 11 and second microphone 12.

Voice activated device 10 may also include audio processor 13, voice activation module 14 and other components 15 controlled by the voice activation module 14.

The components 15 may be controlled according to the voice command. Components 15 may include, for example, one or more radiation sources, communication modules, receivers, one or more speakers, one or more mechanical or electrical components, and the like.

First and second microphones 11 and 12 generate detection signals that are responsive to audio signals sensed by first and second microphones 11 and 12. These audio signals may be generated by a person.

Audio processor 13 receives the detection signals and analyzes the detection signals to determine whether the person that generates the audio signals is proximate to the voice activated device 10.

The audio processor 13 may also detect a voice command that is embedded in the audio signals. Alternatively—another component may detect the voice command.

Proximity may be defined in advance and/or maybe tuned by the person or other entity but usually proximity does not exceed 10 meters (may have any length between 1-999 centimeters). The proximity may range, for example, between 2 centimeters and 5 maters, between 10-90 centimeters, between 5-50 centimeters, between 0.5-4 meters, and the like.

The proximity may be defined based on the locations of different voices activated devices, and/or distances between different voice activated devices at the vicinity of the person, and/or reception parameters of the different voice activated devices at the vicinity of the person. The reception parameters may include, for example sensitivity.

Accordingly—if there is an overlap between the coverage area of one voice activated device and the coverage area of another voice activated device then the proximity sensing may be used to select between the voice activated device. When the person stands in the overlap area and is proximate to to one voice activated device—and not to another—then the one voice activated device may be selected. A more sensitive voice activated device may have a larger range of reception and its proximity range may be larger than the proximity range of a less sensitive device.

It is assumed that when the person is proximate there may be a certain difference between the sounds sensed by the person. Difference between phase and/or amplitude may be within a "proximity range" when the person is proximate to the device and outside the "proximate range" when the person is not proximate to the device.

These differences may be calculated or may be sensed over time. The amplitude difference may be, for example be or may exceed 1, 2, 3, 4, 5, 6, 7, 8, 9, 10, 11, 12, 13, 14, 15, 16, 17, 18, 19, 20 dB. The phase difference may be or may exceed 10, 20, 30, 40, 50, 60, 70, 80, 90, 100, 110, 120, 130, 140, 150, 160, 170, 180, 190, 200, and the like.

The audio processor 13 may send a proximity indicator (and/or a lack of proximity indicator) to voice activation module 14. The voice activation module 14 may be a chip or any other electrical circuit.

The voice activation module 14 may determine to ignore the need to receive the voice trigger and execute a voice command that does not start with the voice trigger—when the person is proximate.

The voice activation module 14 may determine to execute only voice commands that start with the voice trigger (of the voice activation device)—when the person is proximate.

It should be noted that the voice activation module 14 may belong to the voice activated device 10 while the first microphone 11 and second microphone 12 and audio processor 13 may belong to another device (proximity sensing device) that may send the proximity indicator (and/or a lack of proximity indicator) to voice activation module 14. The audio processor 13 may send to the voice activated device the voice command sensed by the audio processor 13.

Alternatively—each one of the voice activated device and the proximity sensing device may include his own audio processor—the voice activated device may have one or more circuits for sending audio signals and extracting a voice command embedded in the signal. The audio processor of the proximity sensing device may or may not have speech recognition capabilities or the capability to sense the voice command.

When the proximity sensing device differs from the voice activated device the proximity that is sensed is the proximity to the device that senses the proximity- and not necessarily the proximity to the voice controlled device. Any reference to the proximity should be applied mutatis mutandis to a proximity to the proximity sensing device.

The voice activated device may be a mobile computerized device such as but not limited to a mobile phone, a smartphone, a personal data assistant, a media player, a streamer, or any other computerized system.

The proximity detection may be based on any proximity sensing other than audio-based proximity sensing. This may include heat based proximity sensing, electromagnetic sensing based proximity sensing, visual-based proximity sensing, near field sensing and the like.

Figure 2:
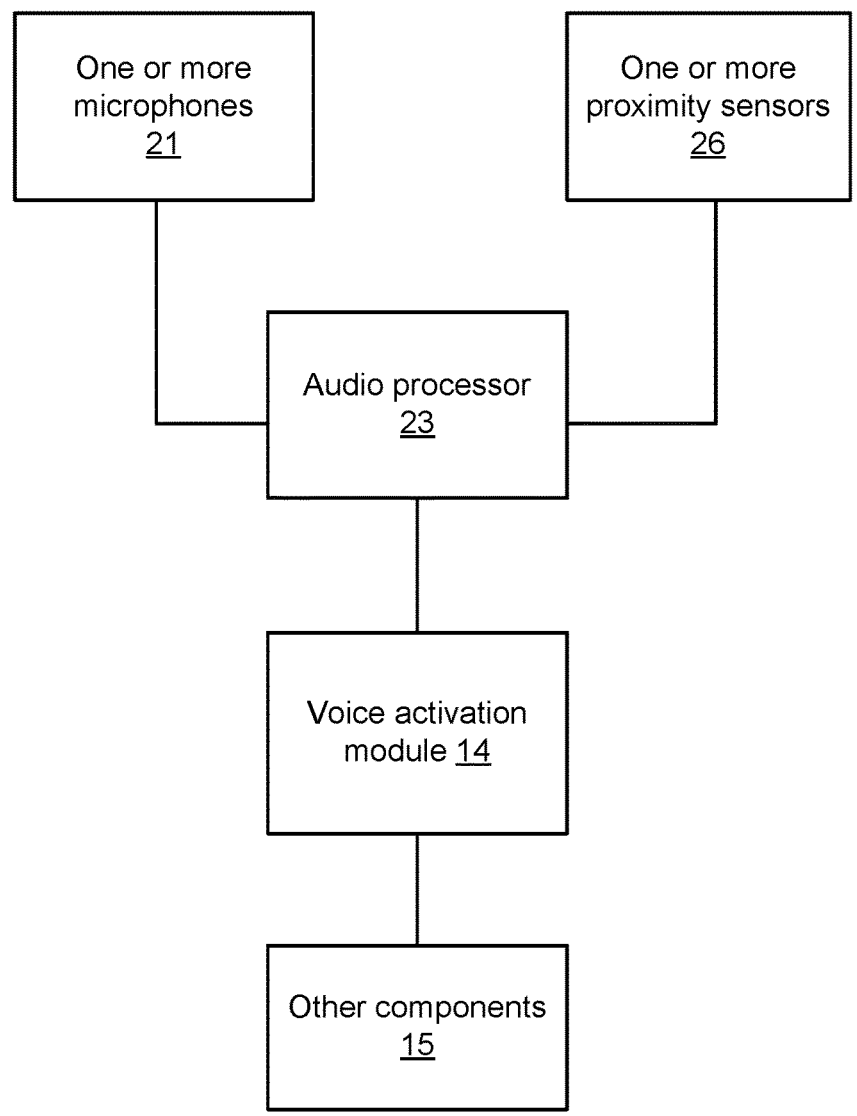
FIG. 2 illustrates an example of a voice activated device.

FIG. 2 illustrates an example of device 20 that includes one or more microphones (collectively denoted 21) for detecting the voice command, and one or more proximity sensors 26 that are not an audio-based proximity sensor. These one or more proximity sensors 26 may include at least one out of a heat proximity sensor, an electromagnetic proximity sensor, a visual proximity sensor, a near field sensor, and the like.

It should be noted that the proximity sensing can be made by a combination of audio based proximity sensing and non-audio based proximity sensing.

The device 20 also includes an audio processor 23 for detecting the voice command, voice activation module 14, and other components 15.

Figure 3:
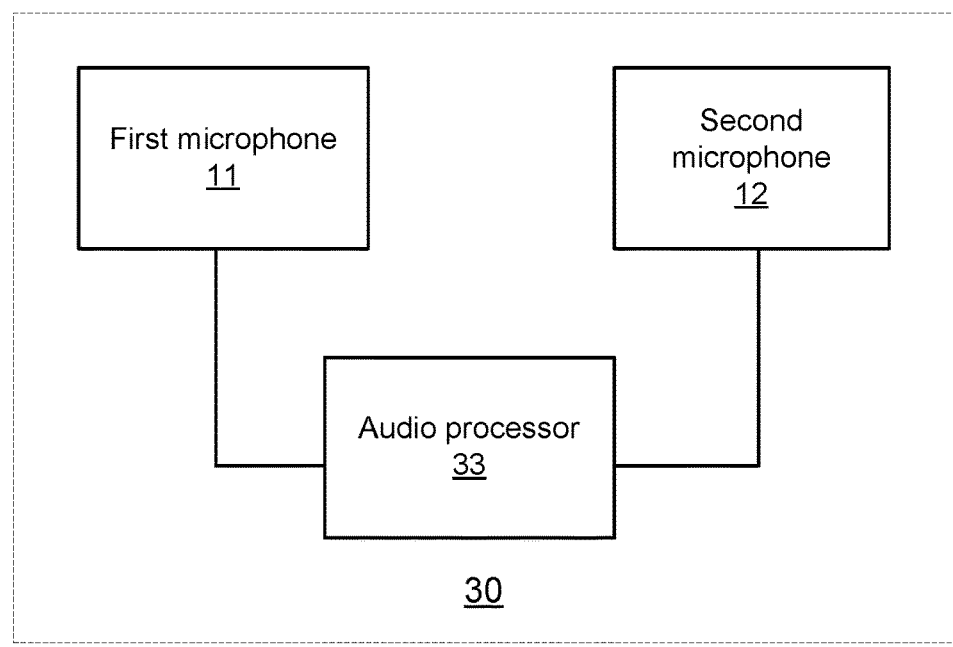
FIG. 3 illustrates an example of a voice activated device and a proximity sensing device.
Figure 3:
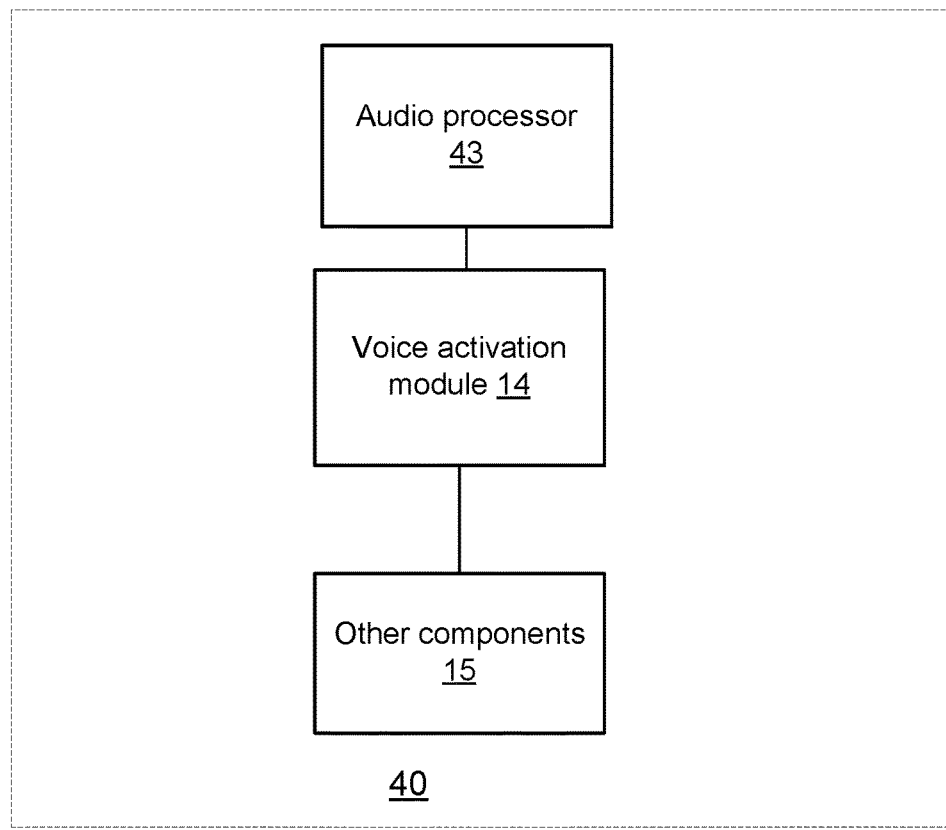

FIG. 3 illustrates a proximity sensing device 30 and a voice activated device 40.

The proximity sensing device 30 includes first microphone 11, second microphone 12 and audio processor 33.

The proximity sensing device 30 sends to the voice activated device 40 a proximity indicator (when the person outputs the voice command while being proximate to the proximity sensing device) and may or may not send information about the audio signals sensed by one or more of first and second microphones.

The voice activated device 40 includes his own audio processor 43, voice activating module 14, and other components 15.

The voice activated device 40 and the proximity sensing device 30 may communicate with each other using communication modules (not shown).

Figure 4:
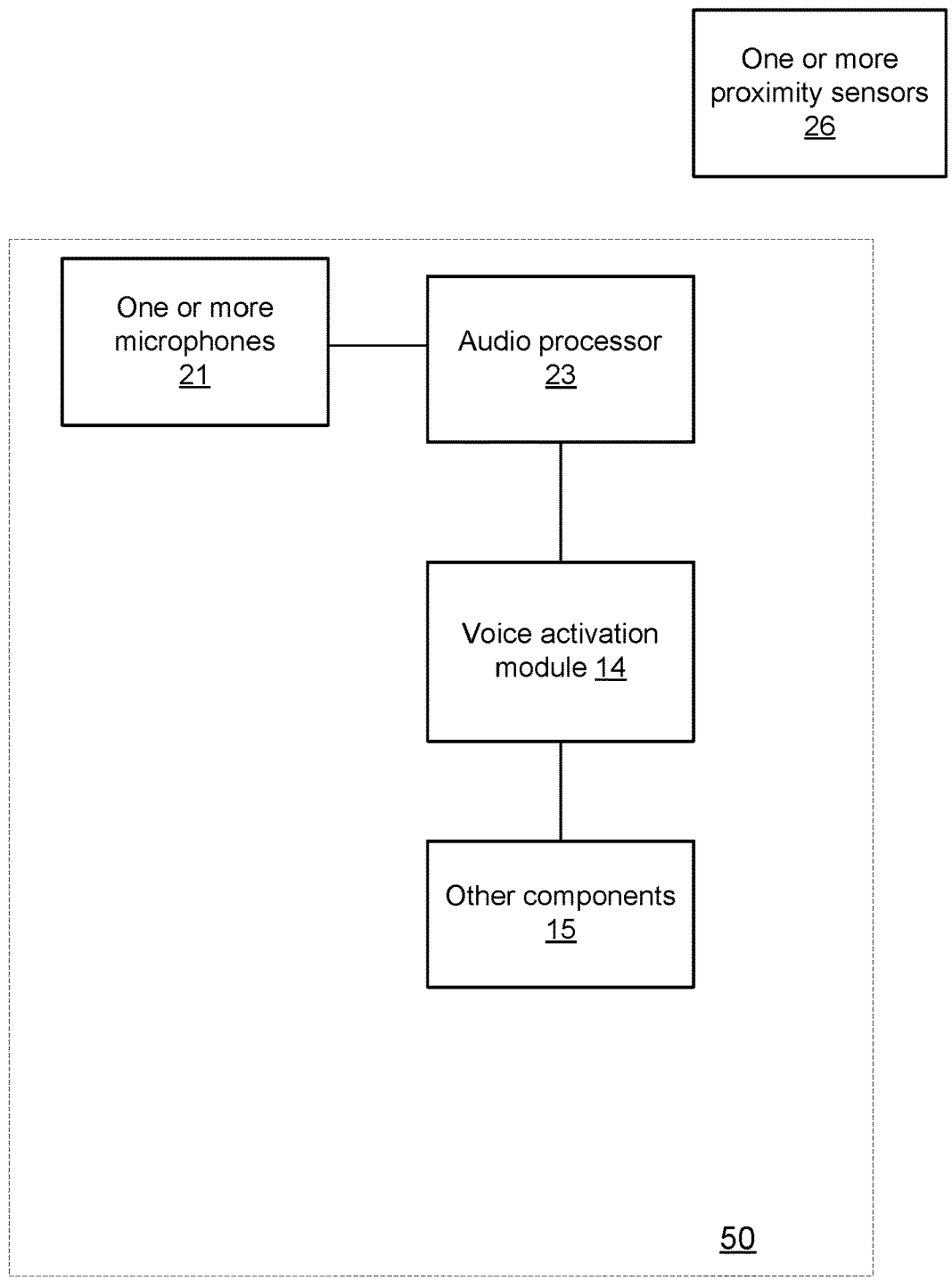
FIG. 4 illustrates an example of a voice activated device and a proximity sensing device.

FIG. 4 illustrates a voice activated device 60 that includes one or more microphones 21, audio processor 23, voice activation module 14 and other components 15. The one or more proximity sensors 26 do not belong to the voice activated device 60—but are configured to communicate (via one or more communication modules—not shown) with the voice activated device 60.

Figure 5:
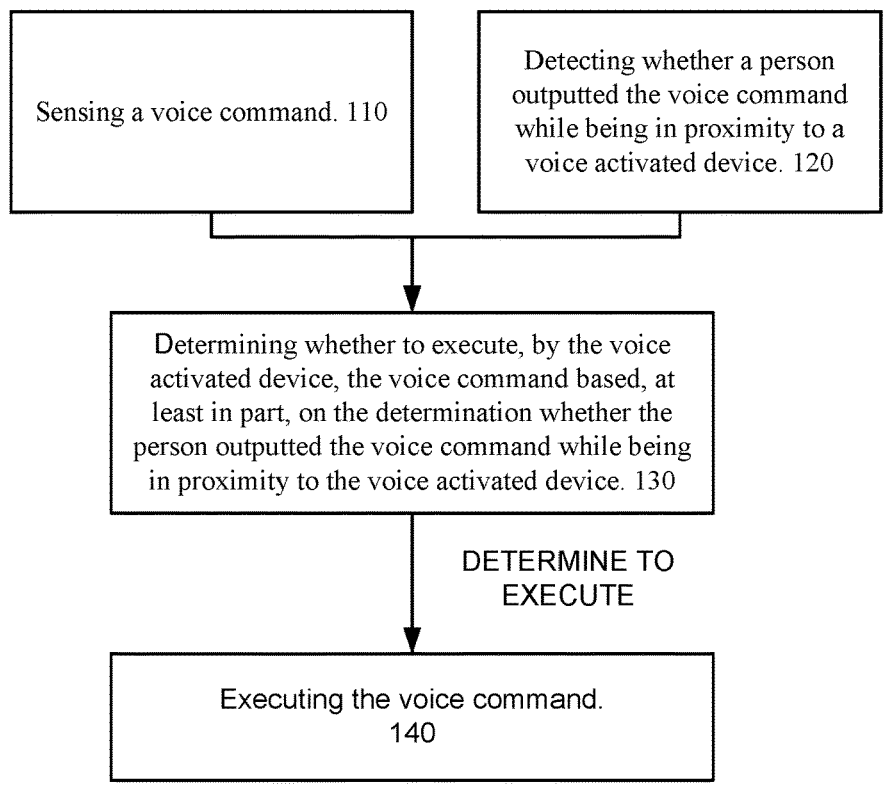
FIG. 5 illustrates an example of a method.

FIG. 5 illustrates an example of method 100.

Method 100 is for proximity-based voice activation.

Method 100 may start by steps 110 and 120.

Step 110 may include sensing a voice command.

Step 120 may include detecting whether a person outputted the voice command while being in proximity to a voice activated device.

Steps 110 and 120 may be followed by step 130 of determining whether to execute, by the voice activated device, the voice command based, at least in part, on the determination whether the person outputted the voice command while being in proximity to the voice activated device.

The determination may be also be responsive to other considerations such as whether the voice command is a valid voice command, whether tot voice command can be currently executed, and the like.

If determining to execute the voice command, then step 130 is followed by step 140 of executing the voice command.

Step 140 may include at least one of the following:
a. Executing the voice command regardless of a presence of a voice trigger within the voice command, when determining that the person outputted the voice command while being in proximity to the voice activated device.
b. Executing the voice command only when (a) a voice trigger is included in the beginning of the voice command and (b) determining that the person outputted the voice command while being in proximity to the voice activated device.
c. Executing the voice command when a voice trigger is included in the beginning of the voice command.

Step 120 may include at least one of the following:
a. Generating, by multiple microphones of a voice activated device, detection signals that are responsive to audio signals sensed by the multiple microphones.
b. Analyzing the detection signals, by an audio processor, to determine whether the person outputted the voice command while being in proximity to the voice activated device.
c. Performing heat based proximity sensing.
d. Performing electromagnetic based proximity sensing.
e. Performing visual based proximity sensing.
f. Performing near field based proximity sensing.

Method 100 include a setting step that may include at least one out of setting a proximity range based on distances between different voice activated devices; setting a proximity range to be smaller than half a distance between different voice activated devices. setting a proximity range based on (a) a distance between different voice activated devices, and (b) reception parameters of the different voice activated devices.

The setting may be executed using one or more voice commands, using any other interface with a person, performing a calibration process in which an audio source (such as the person or an electronic device) is moved between locations and is requested to output audio signals when located in the different locations.

When the proximity sensors are located in a proximity based device that differs from the voice activate device then the detecting (of step 120) may include determining whether a person outputted the voice command while being in proximity to the proximity sensing device.

Any combination of any component of any component and/or unit of device that is illustrated in any of the figures and/or specification and/or the claims may be provided.

Any combination of any device illustrated in any of the figures and/or specification and/or the claims may be provided.

Any combination of steps, operations and/or methods illustrated in any of the figures and/or specification and/or the claims may be provided.

The term "and/or" is additionally or alternatively.

The phrase "may be X" indicates that condition X may be fulfilled. This phrase also suggests that condition X may not be fulfilled The terms "including", "comprising", "having", "consisting" and "consisting essentially of" are used in an interchangeable manner. For example—any method may include at least the steps included in the figures and/or in the specification, only the steps included in the figures and/or the specification. The same applies to the pool cleaning robot and the mobile computer.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any reference to a device should be applied, mutatis mutandis to a method that is executed by a device and/or to a non-transitory computer readable medium that stores instructions that once executed by the device will cause the device to execute the method.

Any reference to method should be applied, mutatis mutandis to a device that is configured to execute the method and/or to a non-transitory computer readable medium that stores instructions that once executed by the device will cause the device to execute the method.

Any reference to a non-transitory computer readable medium should be applied, mutatis mutandis to a method that is executed by a device and/or a device that is configured to execute the instructions stored in the non-transitory computer readable medium.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

A non-transitory computer readable medium may be an integrated chip, a hardware circuit, any hardware memory device, memory component and the like, may be a volatile memory components, a non-volatile memory components, and the like.

I claim:

1. A method for proximity-based voice activation, the method comprises:
   setting, for each voice activated device out of different voice activated devices, a proximity range based on (a) smaller than half of distances between different voice activated devices, and (b) a reception parameter of the voice activated device, wherein the different voice activated devices comprise a first voice activated device and a second voice activated device that is less sensitive than the first voice activated device; wherein the setting comprises (a) assigning to the first voice activated device a proximity range that is larger than proximity range of the second voice activated device; and (b) assigning to the first voice activated device a reception parameter that is larger than a reception parameter range of the second voice activated device;
   sensing, by at least one sensing voice activated device of the different voice activated devices, a voice command;
   detecting, by each sensing voice activated device of the at least one sensing voice activated device, whether a person outputted the voice command while being in proximity to the sensing voice activated device; wherein the detecting comprises determining that the person is in proximity to the sensing voice activated device when the person is within the proximity range of the sensing voice activated device;
   determining whether to execute, by a certain sensing voice activated device of the at least one sensing voice activated device, the voice command based, at least in part, on the determination whether the person outputted the voice command while being in proximity to the certain sensing voice activated device; and
   executing the voice command by the certain sensing voice activated device when determining to execute the voice command.

2. The method according to claim 1, comprising executing the voice command regardless of a presence of a voice trigger within the voice command, when determining that the person outputted the voice command while being in proximity to the certain sensing voice activated device.

3. The method according to claim 1, comprising executing the voice command only when (a) a voice trigger is included in the beginning of the voice command and (b) determining that the person outputted the voice command while being in proximity to the certain sensing voice activated device.

4. The method according to claim 1, comprising executing the voice command when a voice trigger is included in the beginning of the voice command.

5. The method according to claim 1, wherein the detecting comprises: generating, by multiple microphones of each sensing voice activated device of the at least one sensing voice activated device, detection signals that are responsive to audio signals sensed by the multiple microphones; and analyzing the detection signals, by an audio processor, to determine whether the person outputted the voice command while being in proximity to the sensing voice activated device.

6. The method according to claim 1 wherein the detecting comprises heat based proximity sensing.

7. The method according to claim 1 wherein the detecting comprises electromagnetic based proximity sensing.

8. The method according to claim 1 wherein the detecting comprises visual based proximity sensing.

9. The method according to claim 1 wherein the detecting comprises near field based proximity sensing.

10. The method according to claim 1 wherein the reception parameter of the voice activated device is sensitivity of the voice activated device.

11. The method according to claim 1 wherein the determining that the person is in proximity to the sensing voice activated device is based upon differences between phase and amplitude of the voice command.

12. A voice activated device out of different voice activated devices, the device comprises: one or more circuits that are configured to:
    sense a voice command;
    detect whether a person outputted the voice command while being in a proximity range associated with the voice activated device and thereby is in proximity to the voice activated device; wherein the proximity range is set based on, for each voice activated device out of different voice activated devices, (a) smaller than half of distances between different voice activated devices, and (b) a reception parameter of the voice activated device, wherein the different voice activated devices comprise a first voice activated device and a second voice activated device that is less sensitive than the first voice activated device; wherein the setting comprises (a) assigning to the first voice activated device a proximity range that is larger than a proximity range of the second voice activated device; and (b) assigning to the first voice activated device a reception parameter that is larger than a reception parameter range of the second voice activated device;
    determine whether to execute, by the voice activated device, the voice command based, at least in part, on the determination whether the person outputted the voice command while being in proximity to the voice activated device; and
    execute the voice command when determining to execute the voice command.

13. The voice activated device according to claim 12, wherein the voice activated device is configured to execute the voice command regardless of a presence of a voice trigger within the voice command, when determining that the person outputted the voice command while being in proximity to the voice activated device.

14. The voice activated device according to claim 12, wherein the voice activated device is configured to execute the voice command only when (a) a voice trigger is included in the beginning of the voice command and (b) determining that the person outputted the voice command while being in proximity to the voice activated device.

15. The voice activated device according to claim 12, wherein the voice activated device is configured to execute the voice command when a voice trigger is included in the beginning of the voice command.

16. The voice activated device according to claim 12, wherein the one or more circuits comprise: multiple microphones that are configured to generate detection signals that are responsive to audio signals sensed by the multiple microphones; and an audio processor that is configured to analyze the detection signals, to determine whether the person outputted the voice command while being in proximity to the voice activated device.

17. The voice activated device according to claim 12, wherein the one or more circuits comprise a heat based proximity sensor.

18. The voice activated device according to claim 12, wherein the one or more circuits comprise an electromagnetic based proximity sensor.

19. The voice activated device according to claim 12, wherein the one or more circuits comprise a visual based proximity sensor.

20. The voice activated device according to claim 12, wherein the one or more circuits comprise a near field based proximity sensor.

21. The voice activated device according to claim 12, wherein the reception parameter of the voice activated device is sensitivity of the voice activated device.

22. The voice activated device according to claim 12, wherein the one or more circuits are configured to determine that the person is in proximity to the sensing voice activated device based upon differences between phase and amplitude of the voice command.

23. The voice activated device according to claim 12, wherein the one or more circuits are configured to set a proximity range based on (a) a distance between different voice activated devices, and (b) reception parameters of the different voice activated devices.

24. A non-transitory computer readable medium that stores instructions that once executed by a voice activated device out of different voice activated devices cause the voice activated device to execute the steps of: sensing a voice command, detect whether a person outputted the voice command while being in a proximity range associated with the voice activated device and thereby is in proximity to the voice activated device; wherein the proximity range is set based on, for each voice activated device out of different voice activated devices, (a) smaller than half of distances between different voice activated devices, and (b) a reception parameter of the voice activated device, wherein the different voice activated devices comprise a first voice activated device and a second voice activated device that is less sensitive than the first voice activated device; wherein the setting comprises (a) assigning to the first voice activated device a proximity range that is larger than a proximity range of the second voice activated device; and (b) assigning to the first voice activated device a reception parameter that is larger than a reception parameter range of the second voice activated device; determining whether to execute, by the voice activated device, the voice command based, at least in part, on the determination whether the person outputted the voice command while being in proximity to the voice activated device; and executing the voice command when determining to execute the voice command.

* * * * *